United States Patent [19]
Kim

[11] Patent Number: 6,081,593
[45] Date of Patent: Jun. 27, 2000

[54] METHOD AND APPARATUS FOR TRANSMITTING WHITE NOISE FOR ECHO CANCELLATION IN A VOICE MAIL SYSTEM

[75] Inventor: Yeong-Woo Kim, Seoul, Rep. of Korea

[73] Assignee: SamSung Electronics Co., Ltd., Suwon, Rep. of Korea

[21] Appl. No.: 09/030,317

[22] Filed: Feb. 25, 1998

[30] Foreign Application Priority Data

Feb. 25, 1997 [KR] Rep. of Korea ......................... 97-5663

[51] Int. Cl.[7] ....................................................... H04M 1/19
[52] U.S. Cl. ........................ 379/410; 379/406; 375/242; 455/413; 455/570
[58] Field of Search ..................... 379/406, 410, 379/411; 375/242, 254, 243; 455/413, 570

[56] References Cited

U.S. PATENT DOCUMENTS

| | | |
|---|---|---|
| 4,521,647 | 6/1985 | Olson et al. ............................ 379/351 |
| 5,381,474 | 1/1995 | Lähdemäki et al. . |
| 5,400,394 | 3/1995 | Raman et al. . |
| 5,519,764 | 5/1996 | Pierce et al. ............................... 379/67 |
| 5,553,137 | 9/1996 | Nyhart et al. . |
| 5,638,436 | 6/1997 | Hamilton et al. ........................ 379/351 |
| 5,859,907 | 1/1999 | Kawahara et al. ....................... 379/410 |
| 5,913,189 | 6/1999 | Lee et al. ................................ 704/226 |

*Primary Examiner*—David R. Hudspeth
*Assistant Examiner*—Abul K. Azad
*Attorney, Agent, or Firm*—Robert E. Bushnell, Esq.

[57] ABSTRACT

A method for transmitting white noise for echo cancellation in the voice mail system (VMS) for providing voice guidance message services to callers connected with switchboard is characterized in that specified ring-back tone signals are transmitted to the switchboard with the white noise being inserted between the ring-back tone signals.

5 Claims, 6 Drawing Sheets

METHOD AND APPARATUS FOR TRANSMITTING WHITE NOISE FOR ECHO CANCELLATION IN A VOICE MAIL SYSTEM

CLAIM OF PRIORITY

This application makes reference to, incorporates the same herein, and claims all benefits accruing under 35 U.S.C § 119 from an application entitled Method For Transmitting White Noise For Echo Cancellation In Voice Mail System earlier filed in the Korean Industrial Property Office on Feb. 25, 1997, and there duly assigned Ser. No. 97-5663 by that Office.

BACKGROUND OF THE INVENTION

1. Field of the Invention

The present invention relates to a method for canceling echoes in the voice mail system, and more particularly a method for transmitting a training signal for finding out the line characteristic at the beginning of establishing a speech path.

2. Description of the Related Art

Echo cancelers for communication systems, such as telephone communication systems, are well known in the art. Most common echo cancelers utilize a digital adaptive filter wherein coefficients of the filter are updated according to line characteristics in a communication path. Examples of such echo cancelers, and incorporated herein by reference, are found in: U.S. Pat. No. 5,381,474 to Lähdemäki entitled Method Of Converging An Echo Canceler wherein a test signal is transmitted between ringback (ringing tones) signals to the echo path in the direction of the caller in response to a received ringing voltage from the caller; U.S. Pat. No. 5,400,394 to Vijay R. Raman entitled Adaptive Echo Canceler For Voice Messaging System which uses low-level white noise as a training signal and the white noise burst, masked by masking tones, is transmitted to the caller wherein ring-tones are used as the masking tones; and U.S. Pat. No. 5,553,137 to Scott 0. Nyhart entitled Method And Apparatus For Echo Canceling In A Communication System also uses low-level white noise wherein the white noise is generated in a pseudo-random sequence onto a phone line during inter digit dialing time.

Generally, a voice messaging system such as that disclosed in U.S. Pat. No. 5,400,394 is also known as a voice mail system (VMS). The VMS is a centralized digital facility to record speech messages from telephone callers, and the speech messages are stored in the receiver's individual voice mail box connected with the usual switchboard and accessed/replayed remotely by the called subscriber by means of a special code.

It is well known that when a guidance message is transmitted in the VMS, it is echoed back due to a line impedance mismatch. The reflected guidance message drops, to a very low level, the level of the dual tone modulated frequency (DTMF) signal received by the VMS corresponding to the key pressed by the caller. Consequently, it is impossible for the conventional method to provide a service of superior quality because the VMS cannot detect the low level DTMF signal correctly.

In order to solve the above problem, I have disclosed an echo cancellation technique in Korean Patent Application No. 93-28403 entitled Echo Canceling Circuit Based On The Detection Of Dual Tone Multiple Frequency And Echo Canceling Method, filed on Dec. 18, 1993, in which an echo canceler having an adaptive filter implemented by a digital signal processor (DSP) is installed at the fore-end of the DTMF, thereby adjusting the adaptive filter coefficient value by means of a least mean square (LMS) algorithm so that the differential signal, i.e., error between input data passed through the adaptive filter and through the virtual echo path, is converged to a minimum level in the training mode every time when establishing speech paths. However, it is impossible for the technique of the above Korean Patent Application No. 93-28403 to perform echo cancellation perfectly due to the noises inherent in the trunk line and the subscriber line.

In order to cancel echoes due to such trunk and subscriber line noises, I have disclosed another echo cancellation technique in the Korean Patent Application No. 95-16187 entitled Device And Method For Detecting Dual Tone Multiple Frequency Signals filed on Jun. 17, 1995.

Figure 1:
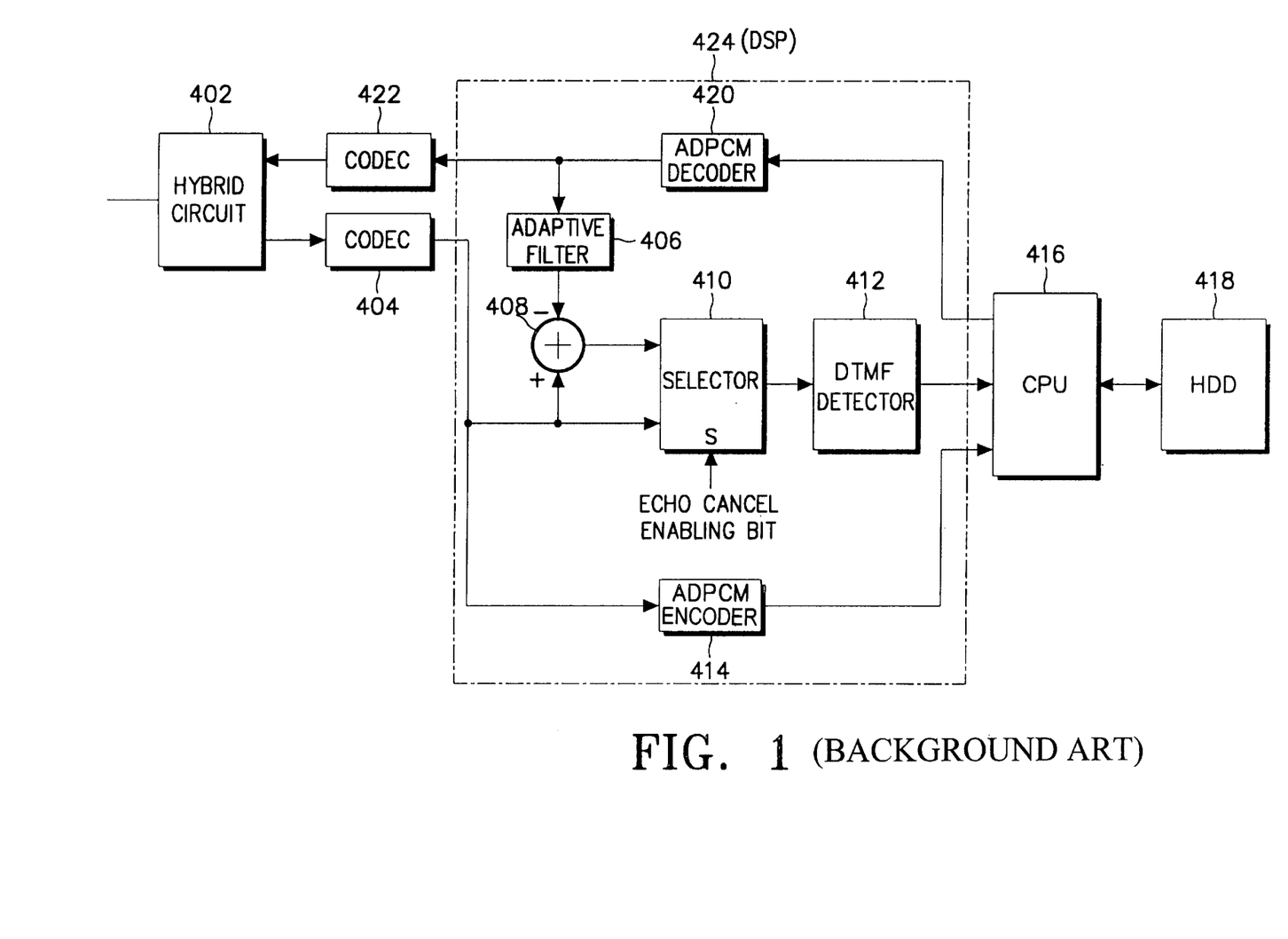
FIG. 1 is a block diagram for illustrating the structure of a voice mail system.

Referring to FIG. 1, the configuration of the voice mail system (VMS) is the same as that of FIG. 4 in the above Korean Patent Application No. 95-16187 which is intended to enable the accurate detection of the DTMF signal despite of the presence of echoes caused by the trunk line noise and/or the subscriber noise.

According to the echo cancellation algorithm disclosed in the above Korean Patent Application No. 95-16187, after finding the basic line characteristic by using a signal close to the training signal for a given period of time (about 150 ms) at the beginning of establishing a speech path, the adaptive filter coefficient is determined on the basis of the resulting line characteristic. However, it is noted that the above training signal used for a specified time interval provides an annoying noise to the caller. Consequently, my voice mail system has the drawback that the DTMF signal received from the caller cannot be detected correctly, and thus the superior quality of the various voice information services can not be guaranteed.

SUMMARY OF THE INVENTION

Accordingly, it is an object of the present invention to provide a method for eliminating the annoying noise being heard by the telephone talker by transmitting training signals for canceling echoes in the voice mail system.

It is another object of the present invention to provide a method for transmitting training signals to more correctly detect DTMF signal in the voice mail system.

It is further another object of the present invention to provide a method for enabling the voice mail system to offer various voice information services.

In attaining the above objects, the present invention provides a method for transmitting white noise for echo cancellation in the voice mail system (VMS) for providing voice guidance message services to subscribers connected with switchboard, characterized in that specified ring-back tone signals are transmitted to the switchboard with the white noise being inserted between the ring-back tone signals.

According to one aspect of the present invention, a method for transmitting white noise for echo cancellation in the VMS for providing voice guidance message services to subscribers connected with a switchboard comprises the steps of detecting a ring signal applied by the switchboard, establishing a speech path between the switchboard and the VMS in response to the ring signal detection, and transmitting specified ring-back tone signals at the beginning of establishing a speech path with white noise being inserted between the ring-back tone signals. The white noise is inserted into the initial position of the ring-back tone signals.

The present invention will now be described more specifically with reference to the drawings attached only by way of example. It is to be noted that like reference numerals and characters used in the accompanying drawings refer to like constituent elements throughout all drawings, and the following examples are given only with the purpose to allow those skilled in the art to better understand the present invention but in no way must they be construed as a limitation of the invention itself.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 2:
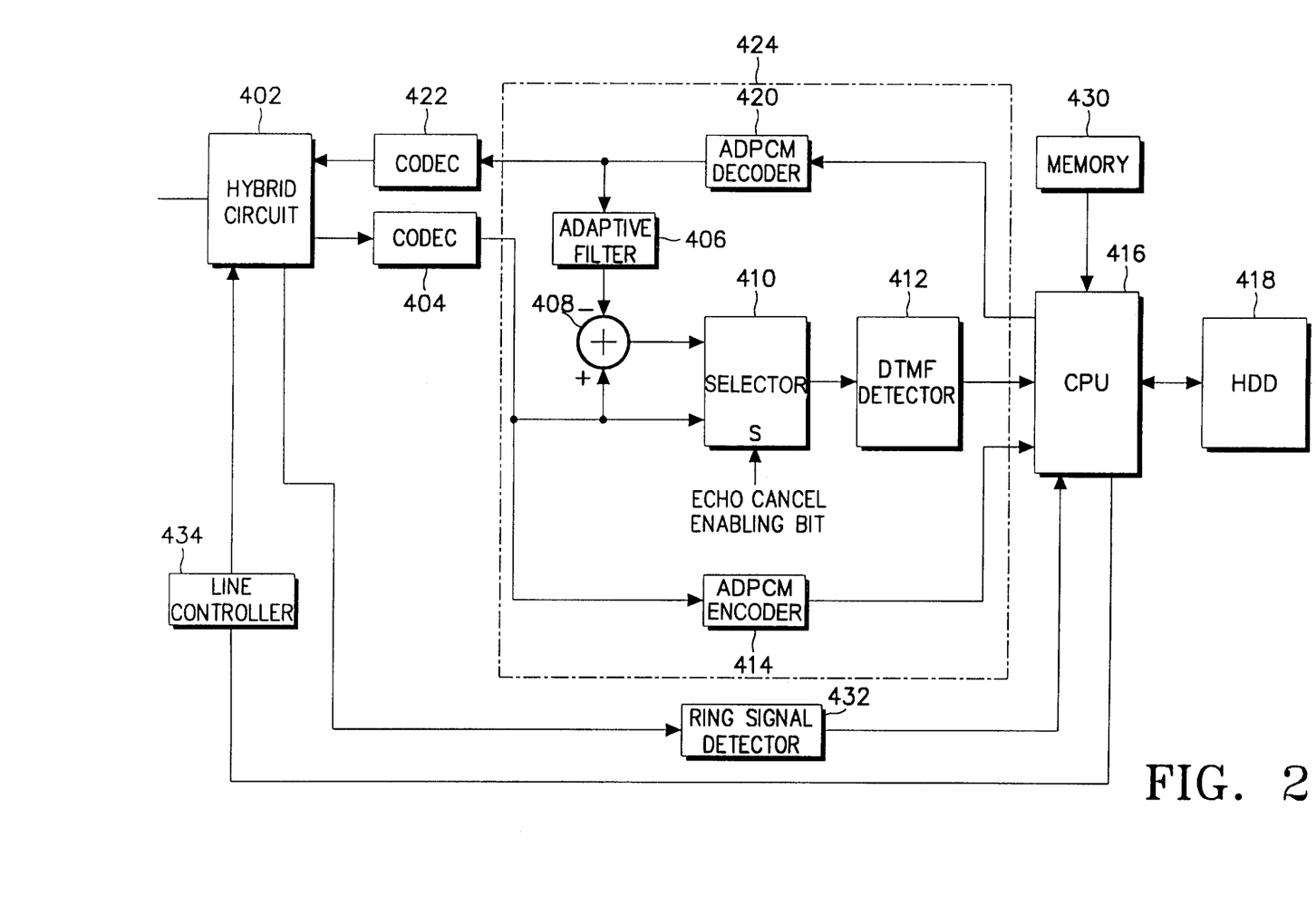
FIG. 2 is a block diagram illustrating the structure of a voice mail system according to the present invention.

Referring to FIGS. 1 and 2, the voice mail system of FIG. 2 according the present invention includes the same constituent elements as those of the voice mail system as depicted in FIG. 1, that is, comprising at least a hybrid circuit 402, coder-decoders (CODECs) 404 and 422, a digital signal processing unit (DSP) 424, a central processing unit (CPU) 416, and a hard disk drive (HDD) 418, and being characterized by further comprising a memory 430, a ring signal detector 432, and a line controller 434.

Hybrid circuit 402 is connected with the trunk line of the switchboard, thereby matching the impedance between the switchboard (not shown) and the voice mail system (VMS). CODEC 404 converts analog signals received from hybrid circuit 402 into pulse code modulation (PCM) audio data. An adaptive filter 406 of DSP 424 is connected to the output terminal of an adaptive differential pulse code modulation (ADPCM) decoder 420, thereby producing the adaptive filter coefficient value from the audio data transmitted to CODEC 422 and to the caller. An adder 408 adds the coefficient value received from adaptive filter 406 to the audio data received from CODEC 404.

A selector 410 selects either the audio data from CODEC 404 or the output data from adder 408 depending upon the state of an echo cancel enabling bit for further transmission, whereby the output data from adder 408 is selected when the echo cancel enabling bit is set, and on the contrary, the audio data from CODEC 404 is selected when the echo cancel enabling bit is cleared. The echo cancel enabling bit is provided for enabling or disabling the echo canceling operation, whereby the echo canceling operation is enabled or disabled when the echo cancel enabling bit is set or cleared respectively.

A DTMF detector 412 detects the DTMF signal from the output data received from selector 410 and ADPCM encoder 414 encodes the audio data received via a reception data line from CODEC 404 by means of adaptive differential pulse code modulation for application to CPU 416. CPU 416 stores the ADPCM audio data received from the ADPCM encoder 414 in HDD 418, or retrieves the ADPCM audio data stored in HDD 418 for further transmission to ADPCM decoder 420 according to the DTMF data received from DTMF detector 412. ADPCM decoder 420 decodes the ADPCM audio data by means of adaptive differential pulse code modulation to further apply the resulting PCM audio data to CODEC 422 and to adaptive filter 406 via a transmission data line. CODEC 422 converts the PCM audio data received from ADPCM decoder 420 into an analog signal, and then transmits the converted analog signal through hybrid circuit 402 to the switchboard (not shown). DSP 424 consists of adaptive filter406, adder408, selector410, ADPCM encoder414, DTMF detector 412, and ADPCM decoder 420.

Various voice messages for diverse voice mail services are stored in HDD 418, and such voice messages are each controlled and retrieved by CPU 416 according to the respective DTMF signal detected by DTMF detector 412 in response to the caller's request for service. Then, the retrieved voice message is transmitted to the switchboard via ADPCM decoder 420, CODEC 422, and hybrid circuit 402, in order for the caller to receive the desired voice message service. Further, since DTMF detector 412 detects the DTMF signal from the output data received from adder 408, then by setting the echo cancel enabling bit, a much more correct DTMF signal can be detected, which is possible because the data on the echo path is added to the data passed through adaptive filter 406 adjusted by the coefficient value for minimizing the data on the echo path.

Figure 3A:
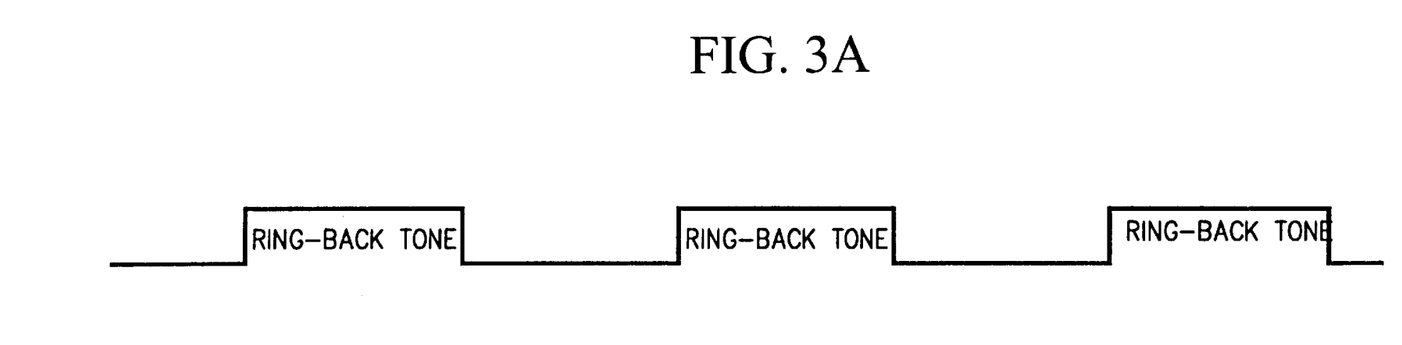
FIGS. 3A and 3B are signal wave diagrams for illustrating the ring-back tone transmitted by the switchboard and voice mail system according to the present invention.
Figure 3B:
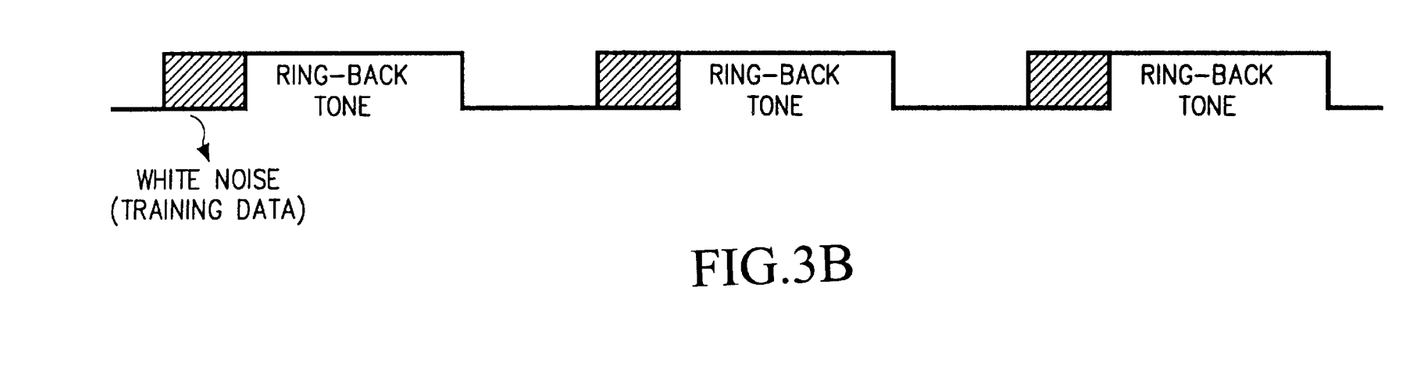

As for ring signal detector 432, line controller 434, and memory 430 as the characteristic elements of the present invention, ring signal detector 432 detects the ring signal being transmitted to the switchboard, and line controller 434 establishes a speech path under the control of CPU 416 when ring signal detector 432 detects the ring signal being transmitted to the switchboard, and memory 430 stores the ring-back tone data containing training data in the form as described later with regard to FIG. 3B.

Referring to FIGS. 3A–3B, FIG. 3A illustrates the ring-back tone transmitted by the switchboard, and FIG. 3B illustrates the ring-back tone transmitted by the VMS. The ring-back tone having a form as depicted in FIG. 3B is stored in memory 430 of FIG. 2.

The ring-back tone in the form of FIG. 3B containing training data is to solve the problem of the prior art. To describe in detail, the prior art employs a training signal for a given period of time at the beginning of establishing the speech path in order to find out the line characteristic, which, however, results in the production of an annoying noise heard by the caller, adversely affecting the caller, and thus making it impossible to provide the caller with the better services.

Accordingly, in order to eliminate the above problems, the present invention provides an apparatus and method capable of preventing such annoying noise from being heard by the caller by transmitting a white-noise signal as training data and a ring-back tone to the switchboard for a specified time interval. In other words, the VMS according the present invention transmits the ring-back tone containing white-noise in the form as shown in FIG. 3B to the switchboard for a specified time interval at the beginning of establishing the speech path to detect the line characteristic for enabling correct detection of the DTMF signal.

Figure 4:
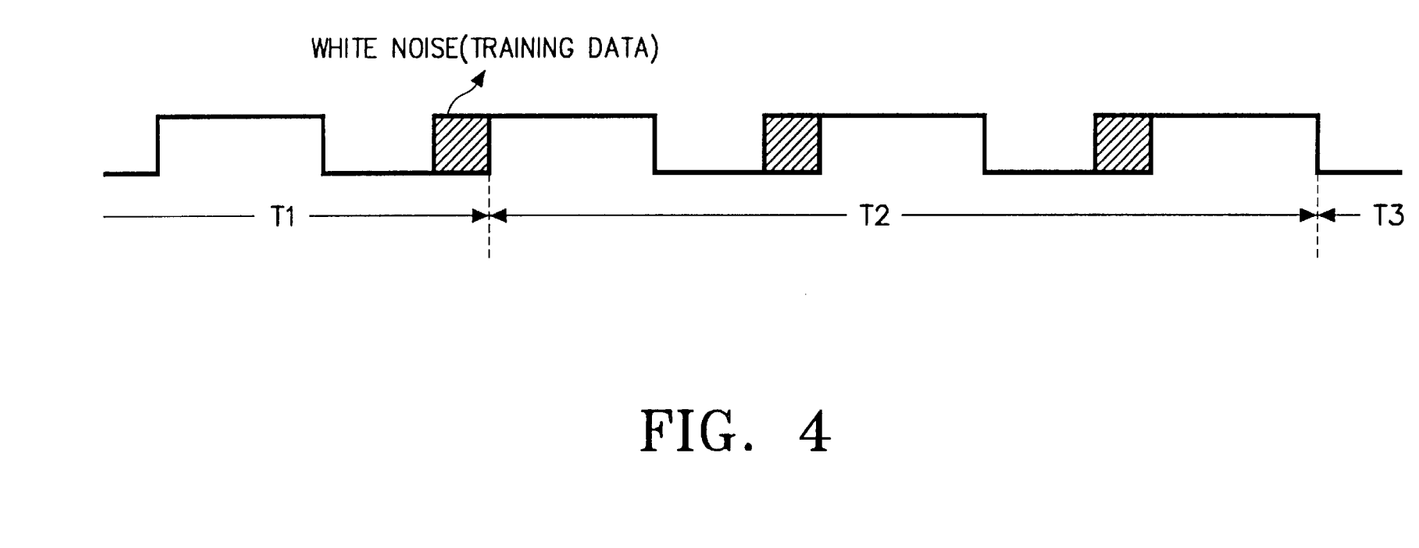
FIG. 4 is a signal wave diagram for illustrating the signals being heard by the subscriber served with the voice mail system based on the present invention.

FIG. 4 illustrates a series of messages to be heard by the caller when requesting the VMS services. Referring to FIG. 4, when requesting the VMS service, the caller hears at first the ring-back tone transmitted by the switchboard during the interval T1. Under this state, when the speech path is established under the control of CPU 416, the caller hears the ring-back tone signals transmitted by the VMS from memory 430 during the interval T2. At this time, since the white noise (training data) is included in the foremost end of each of the ring-back tone signals, the caller may hear the white noise. The white noise, however, is intermittently produced only for a fragment (20–40 ms) of the specified time, not continuously for the entire specified time (150 ms), and for the remaining longer fragment of the specified time, only the ring-back tone is generated. Therefore, the callers are hardly annoyed by the white noise. In other words, in the prior art, the callers hears continuously the annoying noise due to the white noise during the entire specified time interval, but according to the present invention, the callers hear weak noises intermittently only for a very short fragment of time prior to hearing the ring-back tones which are heard for most of the specified time.

Figure 5:
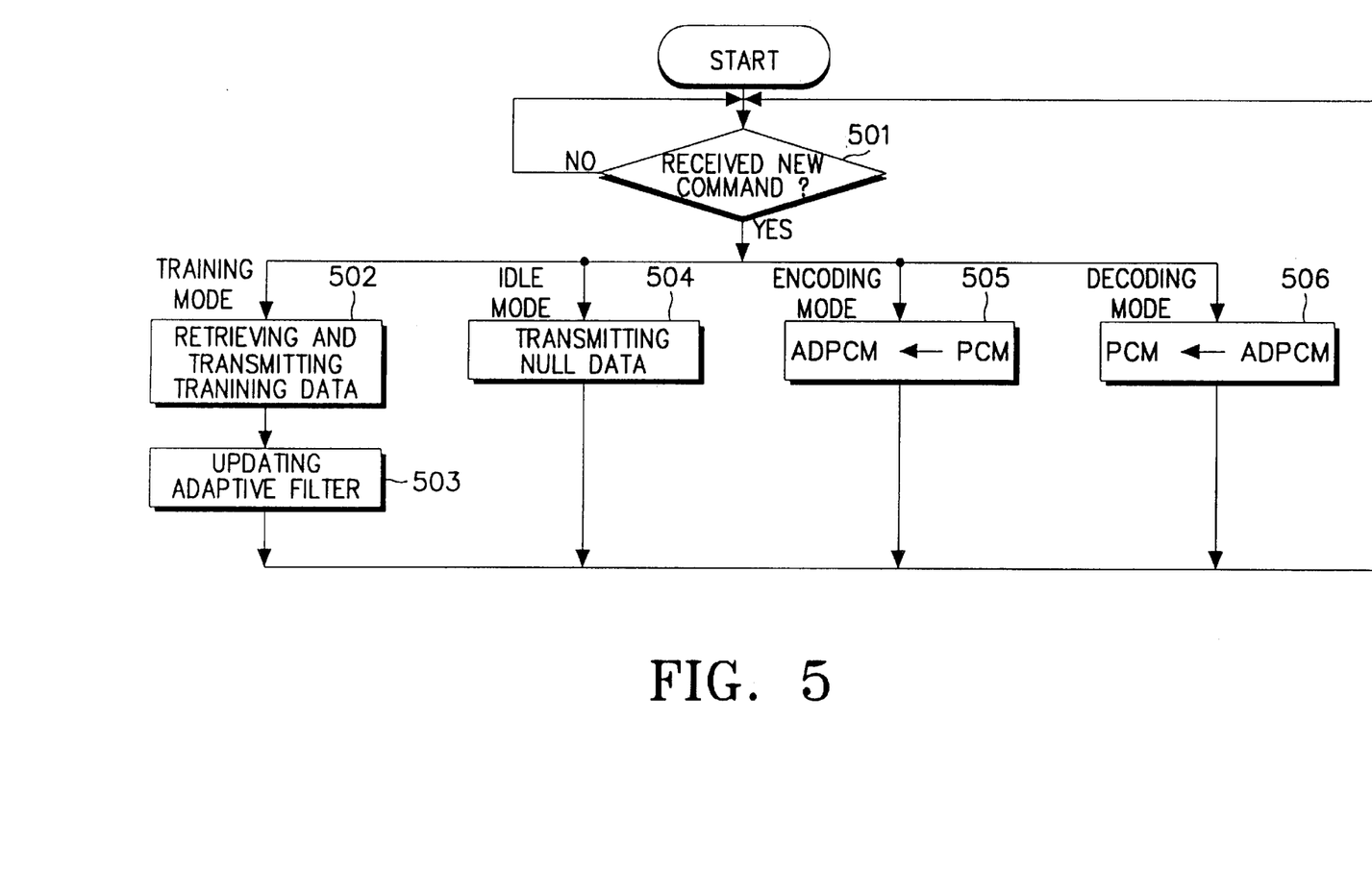
FIG. 5 is a signal-flow graph for illustrating the process flow of the operation modes of the voice mail system according the present invention.

FIG. 5 illustrates the process flow of the operation modes of the voice mail system according the present invention. Each of the above operation modes is controlled by CPU 416 of FIG. 2. Referring to FIG. 5, when receiving a new command in step 501, CPU 416 performs the operation corresponding to the new command. At this time, when receiving the training mode command, in step 502 CPU 416 retrieves the ring-back tone data containing training data from memory 430 for transmission, and in step 503 the coefficient value of adaptive filter 406 is updated according to the line characteristics obtained on the basis of the training data contained in the ring-back tone data.

When receiving a idle mode command in step 501, CPU 416 transmits null data in step 504. When receiving an encoding mode command in step 501, CPU 416 instructs ADPCM encoder 414, in step 505, to convert the PCM data transmitted by the CODEC 404 into ADPCM data. The converted ADPCM data is voice message data to be stored in HDD 418 under the control of CPU 416. When receiving a decoding mode command in step 501, the CPU 416 instructs ADPCM decoder 420, in step 506, to convert the ADPCM data into the PCM data. It is here noted that the above ADPCM data are the voice messages for the various guidance services stored in the HDD 418.

Figure 6:
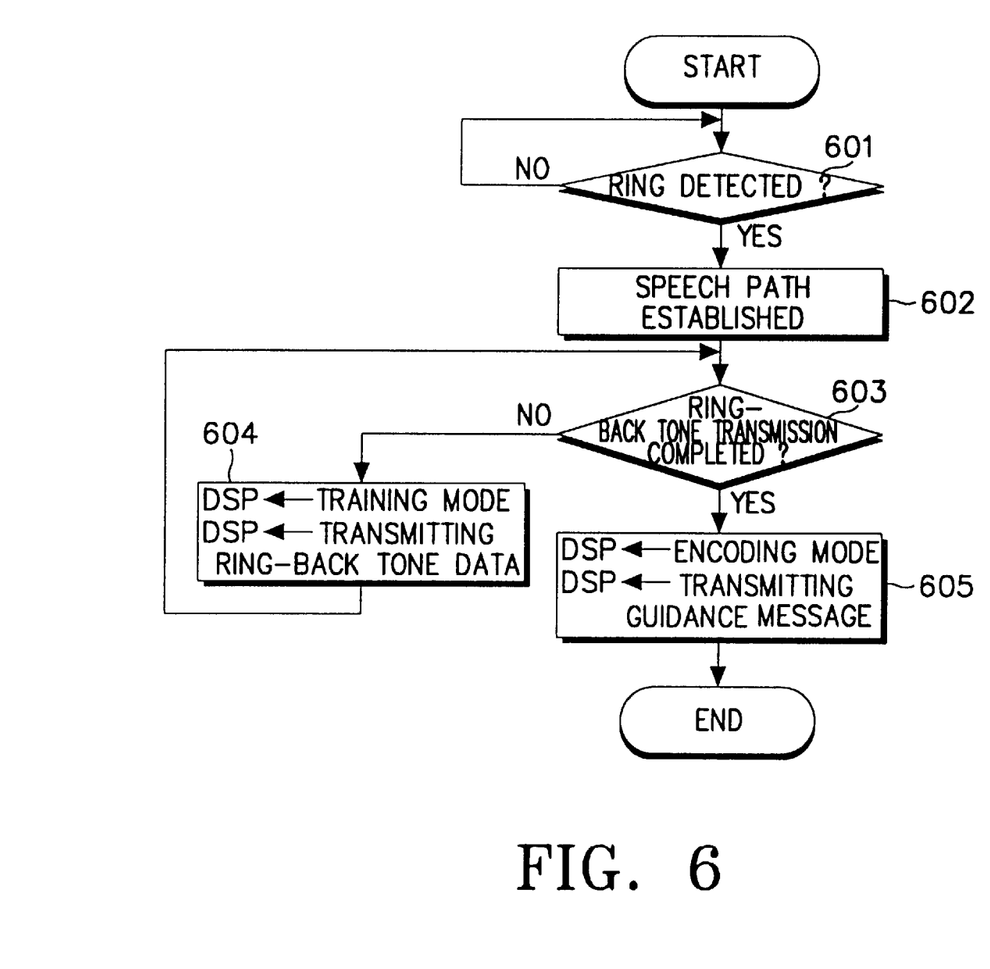
FIG. 6 is a flow chart for illustrating the procedure of transmitting the training signal and the guidance message in the voice mail system according to the present invention.

FIG. 6 illustrates the procedure of the operations being performed when detecting the ring signal in the VMS according to the present invention. Now assuming that a caller dials a call to the VMS, desiring for the voice information service, in step 601 ring signal detector 432 detects the ring signal corresponding to the caller's request for service received through the hybrid circuit 402. In response to the caller's ring signal detected by ring signal detector 432, in step 602 CPU 416 instructs line controller 434 to establish a speech path. In step 603 immediately after establishing the speech path, determines whether or not all the ring-back tone data containing the training data are sent out from memory 603. If not, then in step 604 CPU 416 sets DSP 424 to the training mode and retrieves the ring-back tone data containing the training data stored in memory 430 for application to ADPCM decoder 420 of DSP 424. ADPCM decoder 420 converts the ring-back tone data into PCM data for application to CODEC 422 which in turn converts the above PCM data into an analog signal for further transmission through the hybrid circuit 402 to the switchboard.

The above operations of retrieving and transmitting the ring-back tone data containing the training data are repeated until it is ascertained in step 603 that all the ring-back tone data containing the training data are sent out. Through such repeated operations, the line characteristic can be obtained at the beginning of establishing the speech path. When performing the least mean square (LMS) algorithm by using the above line characteristic, the adaptive coefficient value of adaptive filter 406 for the echo cancellation is obtained. Such an LMS algorithm for obtaining the adaptive coefficient value are well known techniques.

After ascertaining the complete transmission of all the ring-back tone data containing training data in step 603, CPU 416 proceeds to step 605 to set DSP 424 to the encoding mode, and then retrieves the corresponding guidance message stored in the HDD 418 and further transmits this message to ADPCM decoder 420 of the DSP 424. Thereafter ADPCM decoder 420 converts the above retrieved guidance message data into PCM data for further application to CODEC 422 which in turn converts the above converted PCM data into an analog signal for further transmission through hybrid circuit 402 to the switchboard (not shown).

Echoed data developed during the transmission of DTMF signals in response to the guidance message is canceled based on the adjusted adaptive coefficient value of adaptive filter 406, and the DTMF signal cleared of echoes ore further transmitted to selector 410. Consequently, DTMF detector 412 can correctly detect the DTMF signal indicating the caller's request for service.

As described above, the line characteristic can be obtained by transmitting the ring-back tone signal containing white noise at the beginning of establishing the speech path, thereby enabling an adaptive coefficient value to be obtained for the echo cancellation based on the obtained line characteristic. Accordingly, the present invention has the advantages that the DTMF signal can be correctly detected, and the VMS callers will hardly hear any annoying noise due to the white noise contained in the ring-back tone because the white noise is intermittently transmitted only for a very short period of time between the ring-back tone signals.

What is claimed is:

1. A method for transmitting white noise for echo cancellation in a voice mail system for providing voice guidance message services to a caller connected with said voice mail system through a switchboard, said method comprising the steps of:

detecting a ring signal from said caller;

reading, from memory in response to said ring signal, ring-back tone signals including said white noise as a first portion of said ring-back tone signals;

transmitting said ring-back tone signals including said white noise to an adaptive differential pulse code modulation decoder for conversion to pulse code modulated data comprising said ring-back tone signals including said white noise;

supplying said pulse code modulation data to a coder-decoder for conversion to an analog signal for transmission to said caller via a hybrid circuit and said switchboard;

supplying said pulse code modulation data to an adaptive filter for obtaining a coefficient value for use as echo cancellation data; and providing said echo cancellation data to an echo cancellation circuit selectively coupled in a reception path between a second coder-decoder and a dual tone modulated frequency detector for enabling said dual tone modulation frequency detector to correctly detect a dual tone modulated frequency signal generated by said caller, wherein said second coder-decoder converts received analog signals to digital data, said received analog signals being transmitted by said caller via said switchboard and said hybrid circuit.

2. The method as set forth in claim 1, further comprising a step of establishing a speech path between said switchboard and said voice mail system in response to said ring signal detection and transmitting a first ring-back tone signal without said white noise, said first ring-back tone being generated by said switchboard.

3. An echo canceler for a voice mail system connected to a caller via a switchboard, a hybrid circuit, and first and second code circuits, said echo canceler comprising:

a ring signal detector connected to said hybrid circuit for detecting a ring signal;

a memory for storing ring-back tone signals including white noise as a first portion of said ring-back tone signals;

a central processing unit responsive to an output of said ring signal detector for reading from said memory said ring-back tone signals including said white noise;

said central processing unit transmitting said ring-back tone signals including said white noise to an adaptive differential pulse code modulation decoder;

said adaptive differential pulse code modulation decoder for converting said ring-back tone signals including said white noise to pulse code modulated data comprising said ring-back tone signals and said white noise, said pulse code modulation data being supplied to said first coder-decoder for conversion to an analog signal for transmission to said caller via said hybrid circuit and said switchboard;

an adaptive filter coupled to an output terminal of said adaptive differential pulse code modulation for obtaining a coefficient value for use as echo cancellation data in response to said pulse code modulation data;

a dual tone modulated frequency detector for detecting a dual tone modulated frequency signal received generated by said caller; and an echo cancellation circuit for providing echo cancellation on an input signal in response to said echo cancellation data, said input signal being received via a reception path between said second coder-decoder and said dual tone modulated frequency detector, said echo cancellation enabling said dual tone modulation frequency detector to correctly detect said dual tone modulated frequency signal generated by said caller, wherein said second coder-decoder converts received analog signals to digital data, said received analog signals being transmitted by said caller via said switchboard and said hybrid circuit.

4. The echo canceler for a voice mail system as set forth in claim 3, said echo cancellation circuit comprises:

an adder for subtracting said echo coefficient data from said input signal for removing echo; and a selector having a first input terminal connected to an output terminal of said second coder-decoder, a second input terminal connected to an output terminal of said adder and a third input terminal connected to receive an echo cancel enabling bit, said selector connecting said output terminal of said adder to said dual tone modulated frequency detector when said echo cancel enabling bit is set.

5. The echo canceler for a voice mail system as set forth in claim 3, further comprising a line controller responsive to said central processing unit for establishing a speech path between said switchboard and said voice mail system when said ring signal detector detects the ring signal.

* * * * *